May 5, 1925.  
H. H. MEYER, JR  
MEANS FOR SUPPORTING LAMPS  
Filed Nov. 9, 1923
1,536,516
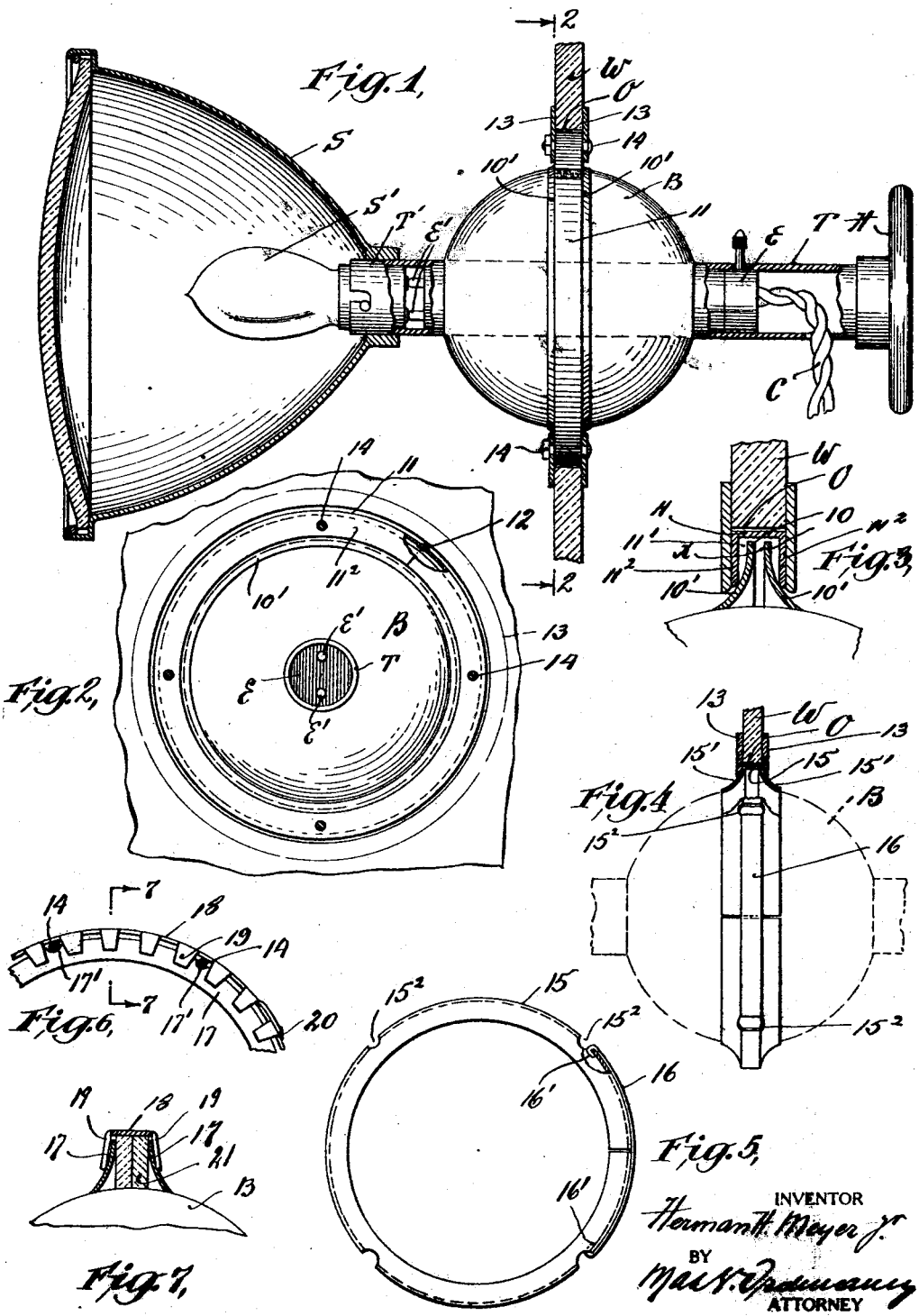
INVENTOR  
Herman H. Meyer Jr  
BY  
ATTORNEY Patented May 5, 1925.

1,536,516

UNITED STATES PATENT OFFICE.

HERMAN H. MEYER, JR., OF NEW YORK, N. Y.

MEANS FOR SUPPORTING LAMPS.

Application filed November 9, 1923. Serial No. 673,635.

*To all whom it may concern:*

Be it known that I, HERMAN H. MEYER, Jr., a citizen of the United States, residing at New York, in the county of Bronx and State of New York, have invented certain new and useful Improvements in Means for Supporting Lamps, of which the following is a specification.

This application is an improvement on my application Serial No. 620,475 which matured into the Patent #1,501,418. The invention relates to means for supporting a lamp, such as a spotlight lamp, on a windshield of an automobile, so that the lamp can be easily and conveniently manipulated from within the car to adjust the same to different positions.

The main object of this invention is to provide a device, which will be simple and comparatively cheap to manufacture and which will be durable and effective.

With this object in view, my invention consists in the novel combination, construction and arrangement of parts, as will be hereinafter more fully described and defined in the appended claims.

In the accompanying drawing in which similar reference characters denote corresponding parts, Fig. 1 is a longitudinal section of the lamp applied to a windshield by my device shown in side elevation; Fig. 2 a cross section on line 2—2 of Fig. 1; Fig. 3 an enlarged longitudinal section of a part of the device and of the windshield; Fig. 4 a side view of a modification of my device partly in section; Fig. 5 a face view of said modified device partly in section; Fig. 6 a face view of another modified form of my device and Fig. 7 a cross section on line 7—7 of Fig. 6.

Referring first to the modification shown in Figs. 1–3, W denotes the window or windshield of a motor vehicle having a circular opening O in which the spotlight S is adapted to be supported by my improved device. The spotlight is carried, as usual, by a sleeve or tube T the forward end of which is formed to a socket T' for the bulb S' and the rear end of which is provided with a suitable handle H. E denotes the electric switch mounted in said tube T and formed at its front with the contact members E' and C denote the electric conductors or wires.

Mounted centrally on the tube T is a spherical element, as a ball B, of a size somewhat smaller than the circular opening O in the windshield and adapted to be retained in the opening O to form a universal joint for the spotlight.

Thus far the construction is well known.

My new device comprises a socket formed of two uniformly sized ring shaped members 10 of thin sheet metal or other suitable resilient material. In its outer diameter, each ring is made to be slightly smaller than the diameter of the opening, so as to fit therein. The body of the ring member is not flat, but curved laterally, as at 10', assuming the shape resembling a truncated cone, the inner or smaller diameter of which is somewhat smaller than the diameter of the ball, so that when said members are mounted from opposite sides onto the ball, the narrower ends thereof will engage the ball around circles smaller than the meridian and the two members will thus together form a socket for the ball. The conical curvature will impart to the ring body such a resiliency as will enable the latter to be drawn or pressed toward the meridian to hold the ball sufficiently tight and thus prevent the lamp from becoming displaced from its adjusted position. The two ring members are adapted to be mounted on the ball parallel to one another with their narrower ends extending in opposite directions and with their wider ends spaced apart as at $x$ a distance somewhat smaller than the thickness of the windshield. In this position, the two ring members 10 are adapted to be locked by a resilient element, such as a split member 11, also of thin sheet metal or other resilient material and of substantially U-shaped cross section.

The channel 11' of said split member is made wide enough to engage around the wider or outer ends of the members 10 when mounted on the ball, as hereinbefore stated, and the side walls of said channel or the flanges $11^2$ are of such a length as to bear with their inner or lower edges on the curved surfaces 10' of the ring members 10 (Fig. 3). In uncontracted condition, when placed around the members 10, the split member 11 will have its ends spread apart a short distance, say about ¼ of an inch. This will permit the split member to be easily placed around or disengaged from the members 10. By contracting or closing the split member 11, the members 10 will be drawn together and tightly engage the ball B. In this tightened position, the ends of the split member can be soldered or otherwise joined by suitable means, as at 12 (Fig. 2). The socket thus produced is held in the opening O of the windshield in a similar manner to that shown in my aforenamed earlier application, to wit: by means of rigid washers or rings 13 joined together by bolts 14. These bolts are adapted to be passed through perforations or recesses provided in the members 10 and 11. Ring gaskets (not shown) of suitable material may be used between the outer washers 13, the windshield W and the socket 10, 11, in order to enable the proper tightening of the latter in position.

By making the split member 11 slightly broader than the opening O, the side rings 13, when tightened, will press against the sides or flanges 11² of the U-shaped member and the latter in turn will be pressed on the curved faces 10′ of the members 10, thereby pressing the latter more effectively against the ball surface.

The modification shown in Fig. 4 is, with the exception of a special lock to be presently described, similar to the construction shown in my copending application hereinbefore referred to. Here the socket for the ball B consists of a single split annular member 15 stamped of thin resilient sheet metal or the like to form a channelled body the side walls 15′ of which are curved to be substantially cone shaped. The diameter of the lateral openings is somewhat smaller than that of the ball B. The member 15 is so admeasured that in uncontracted condition its rim will loosely fit in the opening O of the windshield and engage around the ball with its lateral ends extending around circles of said ball smaller than its meridian. The ring is recessed, as at 15², for the passage of the screw bolts 14 used for joining the outer discs or rings 13 together. For locking the split members in tightened condition, when mounted on the ball, I provide a circularly curved metal element, such as a band 16, whose ends are bent to form hooks 16′. The band in width is about equal to that of the rim of the member 15 and in length so admeasured that the hooks will engage adjacent recesses 15² of the split member, when the latter is contracted to fit tightly around the ball.

This socket with the ball seated in it is secured in the opening O of the windshield in the aforedescribed manner by the discs or washers 13.

In the modification shown in Figs. 6 and 7, the socket is composed of two separate solid annular members 17 shaped like the members 10 in Figs. 1, 2 and 3 and are joined together around the ball by a split annular member 18 of U-shaped cross section whose sides are recessed to form spring tongues 19.

The split ends of the member 18 are adapted to overlap one another, when closed around the members 17 and to be soldered to the body portion, as at 20, so as to form a solid ring. When compressed against the members 17, the spring tongues 19 will tighten the socket on the ball. The socket is secured in place in the opening O of the windshield in the aforedescribed manner, the bolts 14 being passed through recesses 17′ of the rings and through the spaces between adjoining tongues 19. Preferably gaskets 21 of cork or the like may be mounted on the ball B to fill the space between the adjoining members 17.

What I claim is:—

1. In a device for supporting a spotlight in the windshield of an automobile, a spherical element and a socket therefor adapted to be retained in said windshield, said socket comprising two resilient annular members having laterally curved parts engaging around said spherical element and a resilient band embracing said members and tightening them on said spherical element.

2. In a device for supporting a spotlight in the windshield of an automobile, a spherical element and a socket therefor comprising two annular members engaging around said spherical element, circularly curved means circumferentially applied to said annular members for tightening the same around said spherical element and means fixed to the windshield for holding said socket in position therein.

3. In a device for supporting a spotlight in the windshield of an automobile, a spherical element and a socket therefor comprising two annular members engaging around said spherical element, a third annular member having tongues adapted to be tightened around said first named annular members to compress the latter and means fixed to the windshield for holding said socket in position therein.

In testimony whereof I affix my signature in presence of two witnesses.

HERMAN H. MEYER, Jr.

Witnesses:
MAX D. ORDMANN,
JOSEPH T. MCMAHON.